Oct. 17, 1933.  R. NORDENSWAN  1,930,906
SOUND TRANSLATING DEVICE
Filed Jan. 12, 1931  3 Sheets-Sheet 1

INVENTOR
R. NORDENSWAN
BY
Walter C. Kiesel
ATTORNEY

Oct. 17, 1933.  R. NORDENSWAN  1,930,906
SOUND TRANSLATING DEVICE
Filed Jan. 12, 1931   3 Sheets-Sheet 2

INVENTOR
R. NORDENSWAN
BY
Walter C. Kiesel
ATTORNEY

Oct. 17, 1933.   R. NORDENSWAN   1,930,906
SOUND TRANSLATING DEVICE
Filed Jan. 12, 1931   3 Sheets-Sheet 3
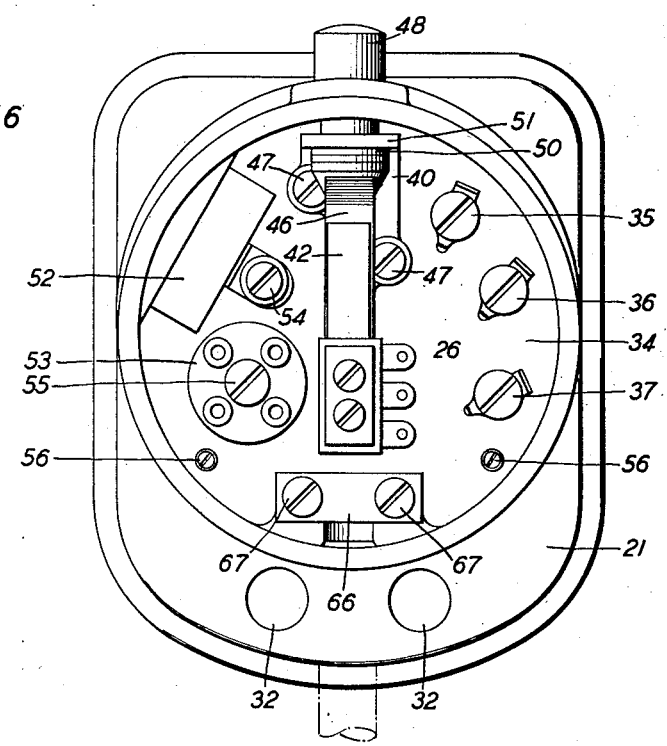
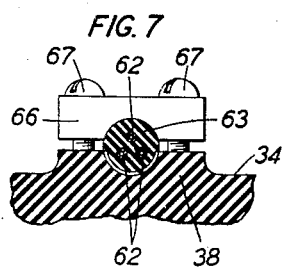
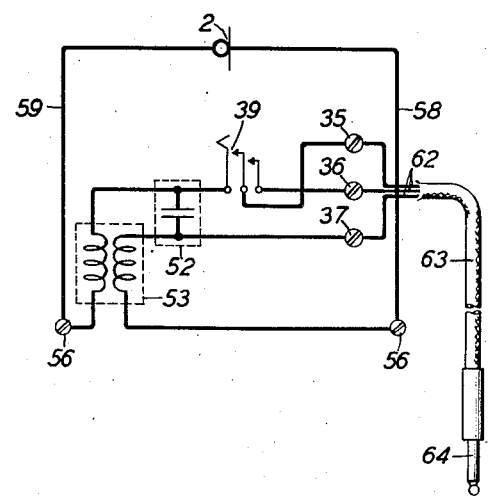
INVENTOR
R. NORDENSWAN
BY
Walter C. Kiesel
ATTORNEY Patented Oct. 17, 1933

1,930,906

UNITED STATES PATENT OFFICE 1,930,906

SOUND TRANSLATING DEVICE

Robert Nordenswan, New York, N. Y., assignor to Bell Telephone Laboratories, Incorporated, New York, N. Y., a corporation of New York Application January 12, 1931. Serial No. 508,210

3 Claims. (Cl. 179—122)

This invention relates to sound translating devices and more particularly to a telephone transmitter which is to be used in places where the extraneous noises make the use of the ordinary transmitter impracticable and more particularly to a transmitter for use in aircraft.

It is highly desirable that the crew of an aircraft be able to communicate freely with one another and also with their co-workers on the ground during a flight. This has become now virtually a necessity in view of the rapid development of commercial aviation inasmuch as the safety of passengers and of property may depend upon the pilot's knowledge of his exact whereabouts and of the weather conditions in the regions through which the course of flight is laid. He should not only be able to receive information but he should also be able to communicate with the crew of the aircraft, to give information to or receive it from them, and with his co-workers on the ground.

An object of this invention is to permit such communication within the aircraft or between it and the ground by providing a portable transmitter and a housing therefor which is compact, conveniently used and which when in use affords ample protection against interference with transmission by the noises created by the aircraft engine or wind without impeding the user in breathing.

Still other objects of this invention are to control at will the flow of electric currents through the transmitter, to prevent the electrical packing of the granular material therein if a variable resistance of granular form is employed, and to permit a prompt and easy transfer of the transmitter from the craft's local circuit to that of, say, a radio broadcasting set.

A further object of this invention is to so construct the housing for the transmitter that it will provide a mounting and enclosure not only for the transmitter but also for all apparatus necessary to carry out the objects recited above and yet enable it to be held in the hand of the user.

In accordance with this invention there is provided a structure comprising a housing for a transmitter, the housing comprising, preferably, a rear portion defining a recess within which a circuit controlling device, means for preventing packing in a transmitter when the device is operated, and circuit terminals are positioned, the recess having, preferably, a removable cover; and a front portion to which a face fitting mouthpiece is secured and which defines a sound passageway in which, in spaced relation to a surface formed by the aforementioned rear portion, a carbon button transmitter is mounted behind a cup member preferably integral with the front portion but having portions spaced from the inner wall thereof providing continuations of the sound passageway. In communication with the sound passageway is a recess which communicates with the atmosphere through an exhaust opening. Projecting through and into the recess in the rear portion of the housing is a means to connect the transmitter through the other elements in the recess with an external electric circuit. This means is secured near one of its extremities against one recess defining surface and at its other extremity is provided with means for connecting the transmitter to a communication circuit local to the aircraft or to a radio broadcasting circuit. This housing is one which may conveniently be held in the hand of the user and against the face of the user to be removed when desired.

A more complete understanding of this invention will be obtained from the description which follows, taken in conjunction with the appended drawings wherein:

Fig. 6 is an enlarged rear view of the transmitter shown in Fig. 1 with its cover removed to show how apparatus associated with the transmitter sound translating unit may be mounted therein;

Fig. 7 shows the means used to secure one extremity of the cord shown in Fig. 1 within the recess portion of the transmitter housing; and Fig. 8 is a schematic diagram of the transmitter shown in Figs. 1 to 6.

Figure 2:
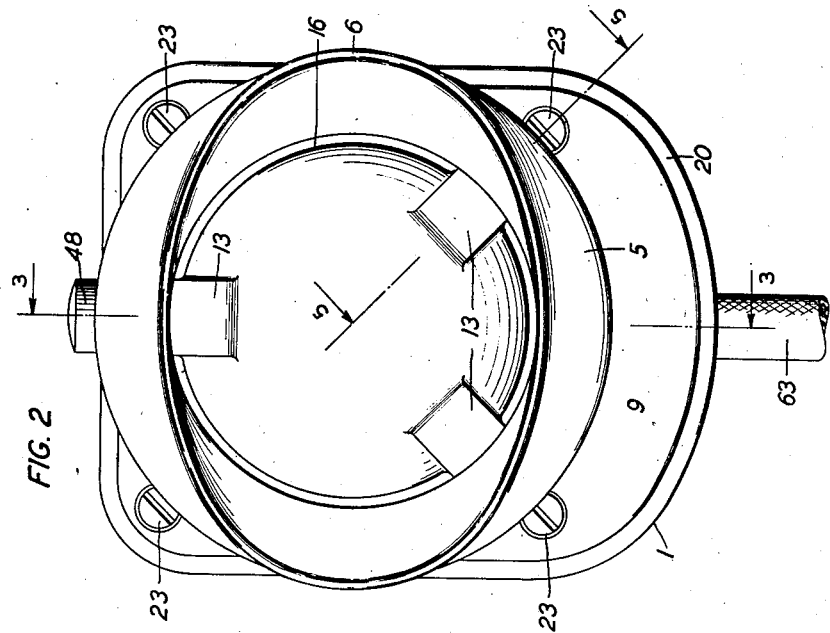
Fig. 2 is an enlarged front view of the transmitter shown in Fig. 1, the greater portion of the cord leading to the plug being omitted.

Referring now to the drawings there is shown a transmitter housing or casing 1 for a sound translating unit 2 preferably of the granular variable resistance material type and similar in general arrangement of parts and functions to the sound translating unit shown in U. S. Patent 1,756,705 issued April 29, 1930, to W. F. Smith, Jr., et al. The diaphragm 3 of the sound translating unit is disposed opposite the surface 4 within the housing 1. The housing 1 comprises a flaring or funnel shaped mouthpiece 5, preferably of a material such as soft rubber, whose outermost edge 6 is shaped to fit snugly against the face of the user and about his mouth. Its innermost edge portion 7 is provided on its internal surface with a groove into which the flanged edge 8 of the anterior portion 9 of the housing is adapted to extend and with a groove 10 on its external surface in which a clamping ring 11 is positioned to firmly secure the mouthpiece to housing portion 9. Supported within the passage 12 of the housing portion 9, by a plurality of projections, or tabs 13, holding it in spaced relation to the inner surface of the wall 14 to form a plurality of arcuately shaped restricted passageways 15, is a shallow cup member 16 provided with a convex continuously curved surface 17 facing in the direction of the user and whose rear concavely dished surface 18 provides a cavity 19 into which a portion of the sound translating unit 2 is adapted to project. This cup member and its supporting projections or tabs are formed preferably integrally with the housing portion 9 which may be molded for instance of a phenol condensation product or the like.

The anterior portion 9 is adapted to fit within the peripheral flange 20 of the posterior portion 21 of the housing from which it is spaced by a gasket 22, preferably of a compressible material, such as soft rubber, and to which it is secured by screws 23 which thread into tapped bushings 24 embedded, preferably, in the posterior portion 21. The portion 21 contains two recesses, 25 and 26, substantially annular in shape, the bottom of the recess 25 providing the surface 4 opposite the diaphragm 3 which together define a sound chamber 27 on one side of the diaphragm. A plurality of raised portions 28 are provided which extend from the surface of the recess 25, each of said portions 28 being located in alignment with one of the cup supporting tabs 13. When the screws 23 are threaded into their bushings 24, the sound translating unit is clamped between the surfaces provided by the tabs 13 and the portions 28, and its peripheral surface 29 is spaced from the lateral wall 30 of the recess 25 to provide continuations of the arcuately shaped restricted passageways 15 leading to the chamber 27 in front of the diaphragm 3. The path for sound waves generated by the user therefore comprises the mouthpiece 5, the passage 12 and the restricted passageways 15, the continuations of the passageways between the sound translating unit 2 and the lateral wall of the recess 25, the chamber 27 between the diaphragm and the opposed surface 4 of recess 25 to the diaphragm 3. It is apparent that before striking the diaphragm the sound waves to be translated will be concentrated and reversed in direction.

Figure 3:
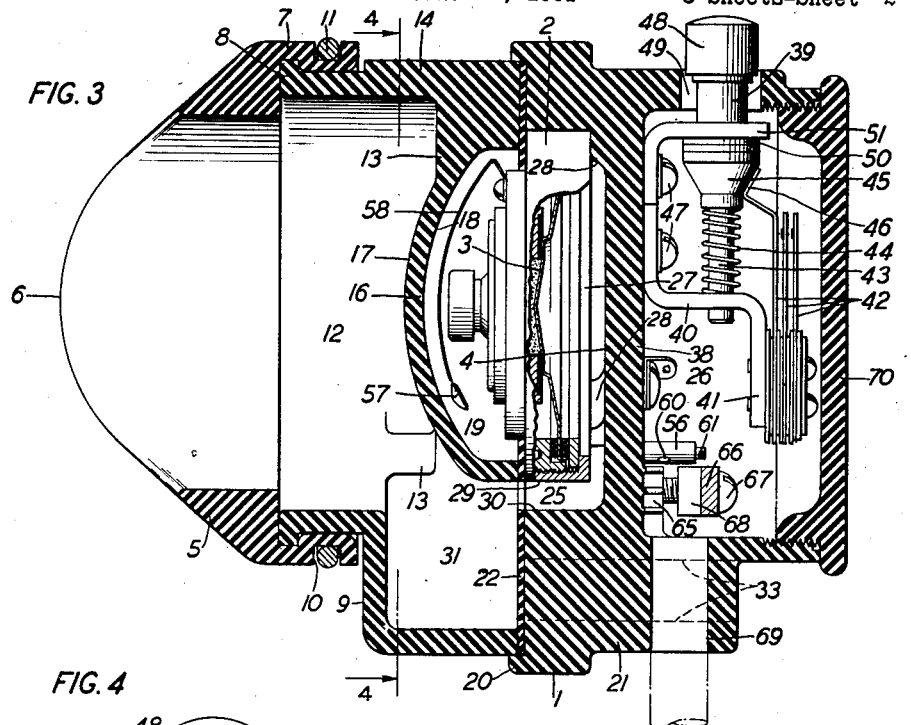
Fig. 3 is a sectional view of the transmitter taken along the line 3—3 of Fig. 2.
Figure 4:
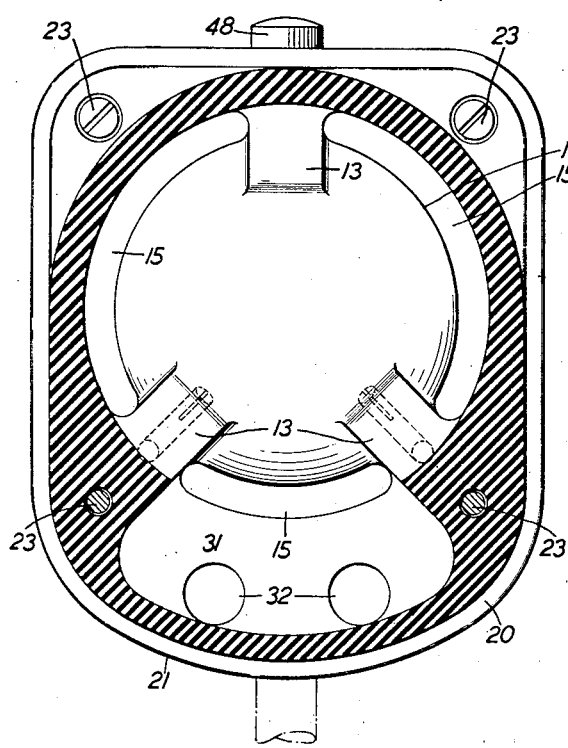
Fig. 4 is another sectional view of the transmitter taken along the line 4—4 of Fig. 3.
Figure 5:
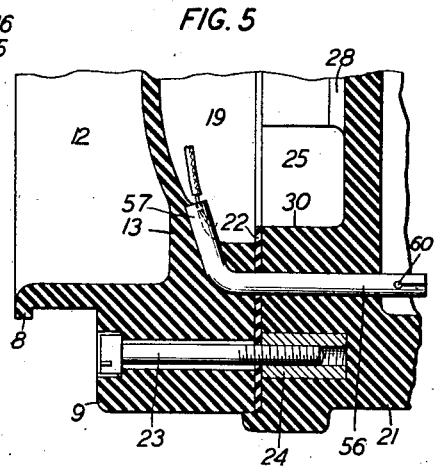
Fig. 5 is a sectional view of the transmitter along the line 5—5 of Fig. 2 with the mouthpiece omitted and shows how the various elements of the transmitter are fastened together and how circuit connections are made to the transmitter.

In shunt to the sound passage in the anterior portion 9 is a cavity 31 whose shape is shown clearly in Fig. 4. This cavity communicates with the atmosphere through a plurality of tubular passages 32 indicated by the dotted lines 33 in Fig. 3 and whose inlet and outlet openings are shown in Figs. 4 and 6 respectively. These passages are provided to allow the user of the transmitter to breathe freely without removing the transmitter from about his mouth and to act as drain passages for condensed breath vapors which collect in the cavity. The passages and the cavity are so proportioned preferably that they act as elements in an acoustic filter which excludes from the interior of the transmitter housing noises which are developed by wind, the aircraft propeller, or the aircraft engine.

Within the recess 26 and mounted on the defining surface 34 thereof is a plurality of terminal screws 35, 36 and 37 which thread into tapped bushings (not shown) embedded in the wall portion 38 of the posterior portion 21 of the housing. A circuit controlling device or switch 39 comprising a U shaped bracket member 40 having a vertical arm 41 upon which a plurality of contact springs 42 are supported in insulated and spaced relation, and a manually operable plunger 43 encircled in its lower portion by a restoring spring 44 and having a frusto-conically shaped shoe 45 of insulating material in slidable engagement with the bent extension 46 of one of the contact springs 42, is secured to the wall 38 by screws 47. The switch button 48 projects through an opening 49 in the housing and is adapted to be depressed by the finger, or fingers, of the user of the transmitter. A washer 50 of shock absorbing or deadening material, such as soft rubber, encircles that portion of the switch plunger between the shoe 45 and the under surface of the arm 51 to aid in preventing packing of the variable resistance material in the sound translating unit 2 by mechanical shock when the user's finger, or fingers, are removed from the depressed switch button and the restoring spring forcibly returns the plunger to its non-depressed position. An electrical capacitance element or condenser 52 and an electrical reactance element or induction coil 53 are supported also on the surface 34 by screws 54 and 55 respectively which project through openings therein to thread into tapped bushings (not shown) embedded in the wall 38.

The circuit connections for the terminals, switch, condenser, induction coil and sound translating unit are shown in the schematic diagram of Fig. 8. The condenser is connected in shunt to the sound translating unit and the windings of the induction coil are connected in series therewith. This condenser and coil are provided in accordance with the teachings in U. S. Patent 1,762,139, issued June 10, 1930, to A. F. Bennett et al, to suppress high frequency currents which would tend to cause electrical packing of the variable resistance material in the sound translating unit when the current therethrough is completed or interrupted upon the operation of the switch 39. Circuit connections are made to the sound translating unit 2 by connector pins 56. These connectors are at one extremity embedded in the cup member 14 and extend slightly into the cavity 19 thereof. To the grooved projecting portions 57, the ends of the wires 58 and 59 (only one of which is shown in Fig. 3), connecting the sound translating unit in an electric circuit, may be suitably secured, for instance, by solder. The portions of the connectors 56 not embedded in the portion 9 of the housing extend through passages in the portion 21 of the housing and project into the recess 26. This portion of the pin is provided with a small drilling 60 into which a wire may be thrust and with a set screw 61 to clamp said wire in said drilling.

Figure 1:
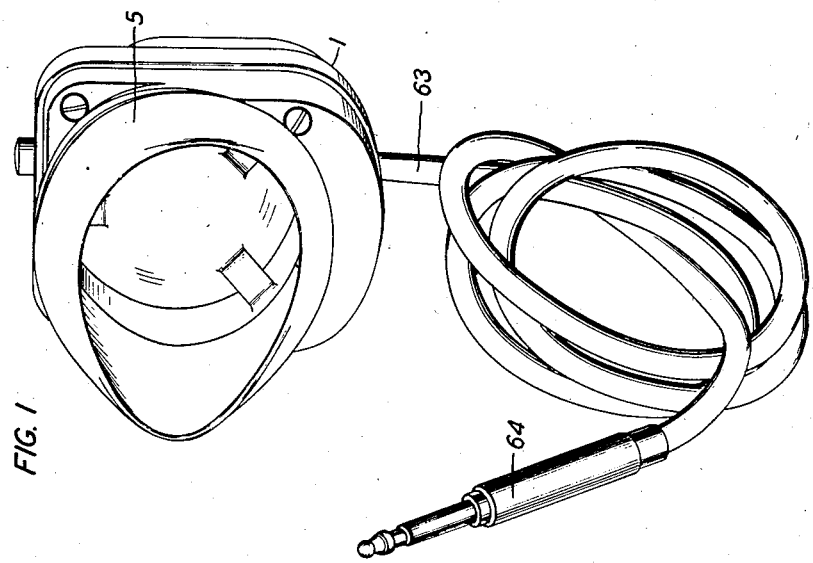
Fig. 1 is a view in perspective of a telephone transmitter embodying this invention and showing means for connecting the transmitter into a communication circuit.

The sound translating unit 2, the anti-packing means 52 and 53 associated therewith, and the switching device 39 are connected through the terminals 35, 36, 37 with an external circuit by conductors 62 enclosed in a cord 63, preferably rubber covered, terminating in a plug 64 as shown in Fig. 1. The cord is secured in a ridged groove portion 65 of the recess defining surface 34 by a bar 66 having a groove 68 shaped to the contour of the cord and held thereagainst by screws 67 threading into tapped bushings (not shown) embedded in the wall portion 38 of the housing. This provides a simple and effective means for securing one extremity of the cord within the recess 26. The conductors 62 in the cord are, of course, connected to the terminals 35, 36, 37. The cord is introduced into the recess 26 through the passage 69. A removable cover 70 provides a closure for the recess 26. Plug 64 is adapted to be thrust into an appropriate jack, or jacks, whereby the transmitter may be connected to a circuit local to the aircraft or to a radio broadcasting circuit.

The transmitter which has been described above is one which is compact, portable and convenient in use, all of which are desirable characteristics in a telephonic device for use in aircraft. It is capable of being held in the hand of the user. It is provided with means to prevent interference by extraneous noises with the transmission of the sound waves generated by the user, with means to prevent packing of the variable resistance material in the sound translating unit used whether this would tend to be caused by electrical or by mechanical disturbances, with means operable by the finger of the user to cut it in or out of a transmission circuit, and with means whereby the transmitter may be connected readily into one of a plurality of circuits; all of which add to the efficiency and the reliability of the device as an aid in airplane communication.

It is to be understood of course that although this invention has been described with reference to a particular embodiment only, it is capable of taking other forms and that, therefore, the scope of this invention is to be considered as limited only by the appended claims.

What is claimed is:

1. In combination, a transmitter and a housing therefor, said housing having one portion in which said transmitter is mounted and to which a mouthpiece is secured, and another portion having a recess therein and providing a surface upon which is mounted means to control a circuit through said transmitter, said surface being provided with a grooved portion, and a cord for connecting the transmitter through said circuit controlling means to an external electric circuit, said cord being near one of its extremities clamped against and forced into the grooved portion of said surface.

2. A sound translating device comprising a transmitter unit including a diaphragm, a housing for said unit, said housing defining a sound passage leading to said diaphragm, a member positioned in said passage, said member presenting one surface to incoming sound waves, having a cavity in another surface, and being spaced from the bounding surface of the sound passage, said transmitter unit positioned behind said member and partially within the cavity therein, electrically conductive means embedded in said member and extending into its cavity, a conductor connecting said means with the transmitter unit, a wall in spaced relation to the diaphragm and having an opening therein through which said means extend, and other conductive means attached to said first mentioned means for connecting it in an electrical transmission circuit.

3. A housing for a transmitter unit and associated electrical equipment comprising a casing containing a sound wave passage, a partition member at one end of the passage, the transmitter unit being spaced from said partition, a second partition member in said passage for directing sound waves around the periphery of the unit against the first partition to be reflected therefrom to the transmitter diaphragm, said casing containing a recess to the rear of the first partition for housing electrical equipment associated with the transmitter, and a removable cover member for said recess enabling access to such equipment.

ROBERT NORDENSWAN.